No. 848,184. PATENTED MAR. 26, 1907.
F. C. LYON.
FOOT ACTUATED LANTERN.
APPLICATION FILED MAR. 12, 1906.
2 SHEETS—SHEET 1.
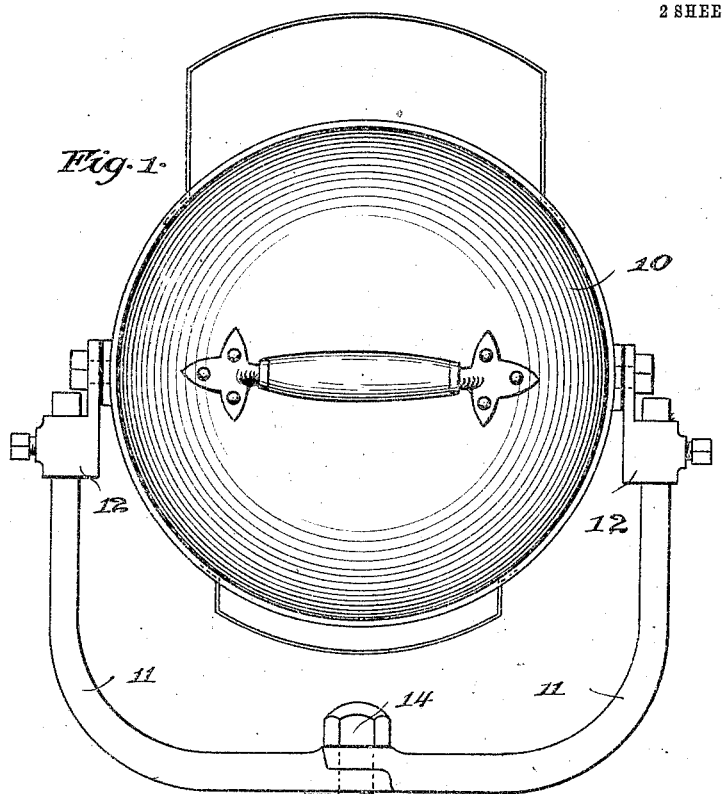
Fig. 1.
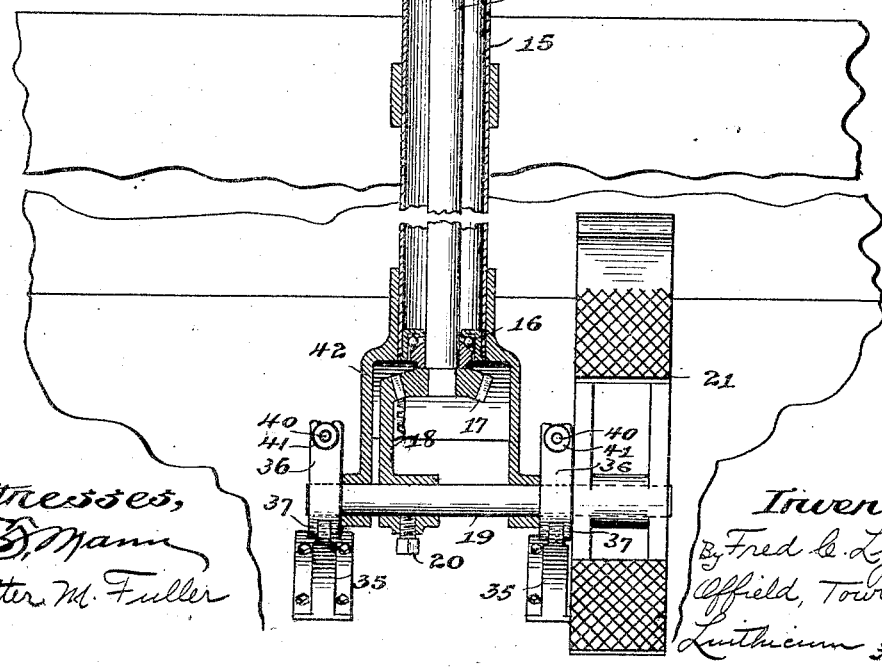
Witnesses,
Inventor,
By Fred C. Lyon

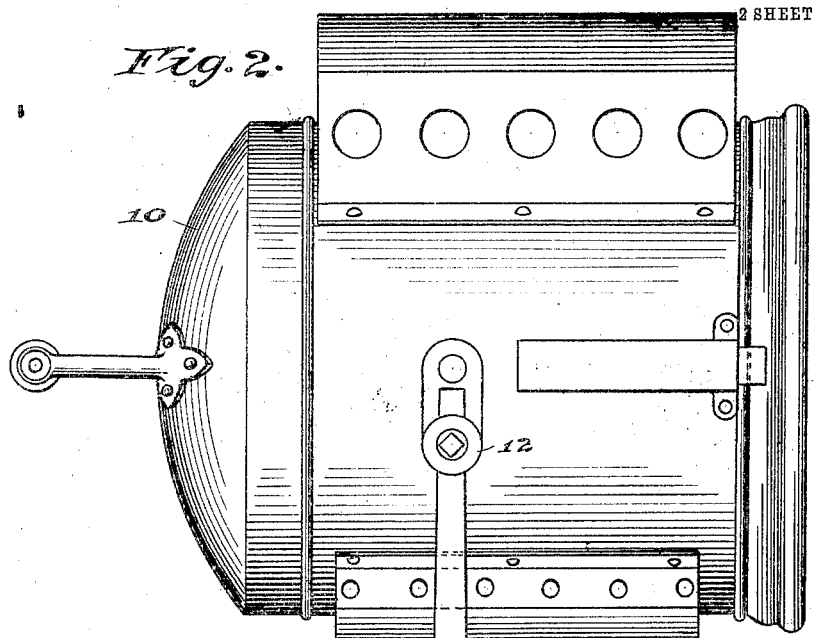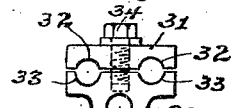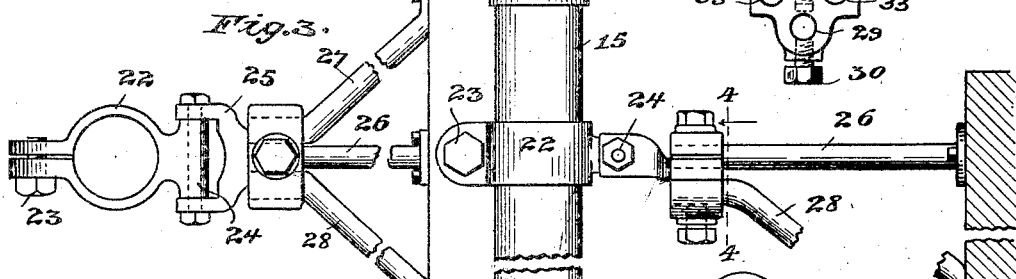

UNITED STATES PATENT OFFICE.

FRED C. LYON, OF EVANSTON, ILLINOIS.

FOOT-ACTUATED LANTERN.

No. 848,184.   Specification of Letters Patent.   Patented March 26, 1907.

Application filed March 12, 1906. Serial No. 305,706.

*To all whom it may concern:*

Be it known that I, FRED C. LYON, a citizen of the United States, residing at Evanston, in the county of Cook and State of Illinois, have invented certain new and useful Improvements in Foot-Actuated Lanterns, of which the following is a specification.

My invention relates to headlights or search-lights for automobiles or other vehicles, and concerns particularly such lanterns as are movable laterally by the foot of the operator or chauffeur of the vehicle.

In turning corners it is advantageous to be able to direct the lamp's rays around the corner even before the vehicle itself turns. It is also of advantage to be able to direct the lamp sidewise, so as to read the numbers or door-plates on the houses. Since the operator's hands are usually more or less occupied in steering and controlling the automobile, I have devised a means for turning the headlight in either direction laterally by means of the foot, and my device comprises an upright shaft at the top of which is supported and adapted to turn therewith any one of the usual types of lanterns or search-lights. This shaft is surrounded by an outer casing, which near its upper end has a pivotal connection with a support fixed to the dashboard or other portion of the vehicle, while the lower end of the casing is supported on a horizontal shaft having a gear connection with the upright shaft, and which also has a treadle or pedal by which it may be rocked. Since it is desirable that the jarring of the machine shall not rotate the lamp, I mount the horizontal shaft in bearings from which it may be readily removed and the friction of which on the shaft may be adjusted. These bearings of the horizontal shaft are screwed or bolted to the floor or footboard of the vehicle, and by removing the shaft from its bearings the upright shaft and lamp may be turned on the pivotal connection near its upper end, so that ready access may be had to the parts of the machine beneath the floor or at the front end of the automobile.

Another feature of my device is the adjustability of the support for the upper end of the casing encircling the upright shaft so as to adapt it for use in vehicles of widely-different types.

Referring to the accompanying drawings, wherein the preferred embodiment of my invention is illustrated, Figure 1 is a rear elevation of my dirigible lantern and actuating mechanism, partly in section. Fig. 2 is a side elevation of the device, also partly in section. Fig. 3 is a plan of the support for the upper end of the vertical shaft. Fig. 4 is a section on the line 4 4 of Fig. 2 as viewed in the direction indicated by the arrows. Fig. 5 is an end view of one of the bearings for the horizontal shaft, and Fig. 6 is a side elevation of the same.

The lantern or search-light 10 is mounted on the two spaced arms 11 11, having perforated ears fitting over the ends of the arms, or by means of lugs 12 12, to which it is pivoted, as is most clearly shown in Fig. 1. The bent arms 11 are secured on the upper end of a vertical shaft 13 and are held by the nut 14, screwed on the end of the shaft, so as to rotate or rock therewith. A stationary cylindrical casing 15 encircles the shaft, and between the two, at their top and bottom ends, are the ball-bearings 16 to facilitate the turning of the shaft. At its lower end shaft 13 is equipped with a gear 17, whose teeth mesh with those of a gear-segment 18, fixed on a horizontal shaft 19 by means of a set-screw 20. At one end of shaft 19 is provided the foot-treadle or pedal 21, having at its top end a toe-clip 21ᵃ.

Near its upper end casing 15 has a split ring 22 encircling it, which is firmly clamped to the casing by means of the screw or bolt 23. At its inner end ring 22 is pivotally mounted on a bolt 24, supported on a bracket 25, which is adjustable longitudinally of three rods 26, 27, and 28, which at their other ends are bolted to the dashboard or other convenient support. The end of the inclined supporting rod or brace 26 fits in the aperture 29 of bracket 25, being held in position by a set-screw 30, bearing against the same. A block 31, recessed at 32, is adapted to fit over the ends of the horizontal diverging rods 28 and 29, which lie in the recesses 33 of the bracket 25 and is clamped thereto by a screw 34. By means of this construction the upper end of shaft 13 and its inclosing casing 15 may be adjusted to some extent, so as to bring it in proper vertical position. Since different types of vehicles of which this lantern-directing means is adapted to be attached vary greatly in construction, an assortment of rods 26, 27, and 28, varied in length, may be kept in stock to be adapted for use in these different vehicles.

Brackets 35, secured to the vehicle-floor or to a foot-board, two of which are illustrated in the present instance, support the horizontal shaft 19, and each is provided with a hinged cap or cover 36, pivoted at 37, which is adapted to be opened or moved downwardly, thereby permitting the removal of the shaft. Each bearing 35 and cap 36 has an extension 38 and 39, respectively, to the former of which is pivoted a screw 40, on the end of which is threaded a thumb-nut 41. This screw 40 normally passes through a slot, as shown in Fig. 5, in the top 36 of the bearing on which the nut is screwed down to produce the proper amount of friction to prevent the shaft from turning unintentionally. When it is desired to remove the shaft in order to get at the machine below the floor or to other parts of the vehicle, each nut 41 is loosened and the pivot-screw moved out of the slot, so as to free the cap, which is turned on its pivot 37, thus opening up the bearing and permitting the shaft to be taken out. Mounted on this shaft is also a sleeve 42, which fits over the casing 15, as is shown in Figs. 1 and 2, and when shaft 19 is removed from its bearings to inspect the mechanism below the floor this sleeve is also moved, so that the shaft 13, casing 15, and lantern 10 are turned on the pivot-bolt 24. After the inspection or repairs have been effected the horizontal shaft may be readily replaced in the bearings, thus bringing the upright shaft again into vertical and operative position.

The details of this structure as described, above and shown in the accompanying drawings may be modified greatly without departing from the substance of my invention as defined by the appended claims.

I claim—

1. In a device of the character described, the combination of an upright rotatable shaft adapted to be secured to a vehicle and to turn a lantern, a horizontal shaft, means connecting said horizontal and upright shaft whereby the rotation of the former is transmitted to the latter, one or more bearings for said horizontal shaft, caps for said bearings contacting with said shaft, screw-threaded means for regulating the friction of said caps on said horizontal shaft, and a treadle on said horizontal shaft whereby the latter may be turned by the foot, substantially as described.

2. In a device of the character described, the combination of an upright rotatable shaft adapted to turn a lantern, a support for said shaft to which the latter is hinged, a second support for said shaft from which the latter is detachable whereby the shaft may be turned on said hinge, substantially as described.

3. In a device of the character described, the combination of an upright rotatable shaft adapted to support and turn a lantern, a support for said shaft with which the latter has a hinged connection, a horizontal shaft, means connecting said horizontal and upright shafts whereby the rotation of the former is transmitted to the latter, one or more bearings for said horizontal shaft from which said shaft may be readily removed, substantially as described.

4. In a device of the character described, an adjustable support for a shaft comprising a bracket, said shaft having a hinged connection therewith, and a plurality of supporting-rods on which said bracket is longitudinally adjustable, substantially as described.

5. In a device of the character described, a hinged support for a shaft comprising a bracket, a plurality of rods, and means affording adjustment of said bracket on said rods, substantially as described.

As evidence that I claim the foregoing as my invention I have signed the same, this 8th day of March, 1906, in the presence of two witnesses.

FRED C. LYON.

Witnesses:
CLYDE R. LYON,
J. E. WILLIS.